United States Patent [19]

Morrison

[11] 4,247,080
[45] Jan. 27, 1981

[54] SEAL ASSEMBLY FOR VALVES

[75] Inventor: Bertram L. Morrison, Houston, Tex.

[73] Assignee: ACF Industries, Incorporated, New York, N.Y.

[21] Appl. No.: 972,149

[22] Filed: Dec. 21, 1978

[51] Int. Cl.³ .............................................. F16K 5/06
[52] U.S. Cl. ..................................... 251/315; 251/359
[58] Field of Search ........................ 251/328, 315, 359

[56] References Cited

U.S. PATENT DOCUMENTS

| | | | |
|---|---|---|---|
| 3,235,224 | 2/1966 | Grove | 251/315 |
| 3,408,038 | 10/1968 | Scaramucci | 251/315 |
| 3,447,781 | 6/1969 | Fawkes | 251/315 |
| 3,462,120 | 8/1969 | Priese | 251/315 |
| 3,677,514 | 7/1972 | Mencarelli | 251/315 |
| 3,765,440 | 10/1973 | Grove et al. | 251/315 |
| 3,765,647 | 10/1973 | Grove et al. | 251/328 |
| 4,034,959 | 7/1977 | Morrison | 251/328 |
| 4,163,544 | 8/1979 | Fowler et al. | 251/328 |

Primary Examiner—William R. Cline
Assistant Examiner—H. Jay Spiegel
Attorney, Agent, or Firm—Stephen T. Belsheim; Eugene N. Riddle

[57] ABSTRACT

There is disclosed a seal assembly for sealing between the body of a valve and the closure member thereof, as well as a method for mounting the assembly within an annular groove with the body which surrounds the flowway through one side of the valve. The seal assembly comprises inner and outer seal rings of relatively hard and soft material which are locked within the groove by a resin which has hardened in the groove as the rings are held in predetermined endwise positions therein.

10 Claims, 5 Drawing Figures

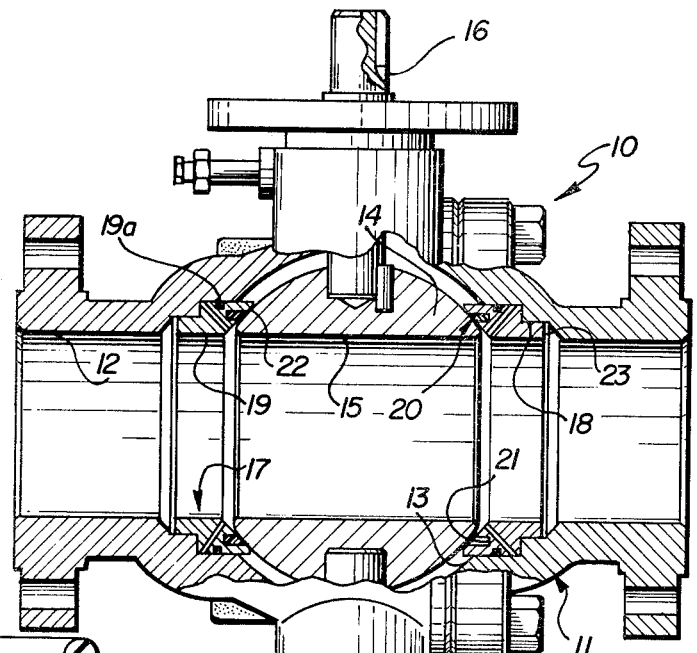
FIG. 1
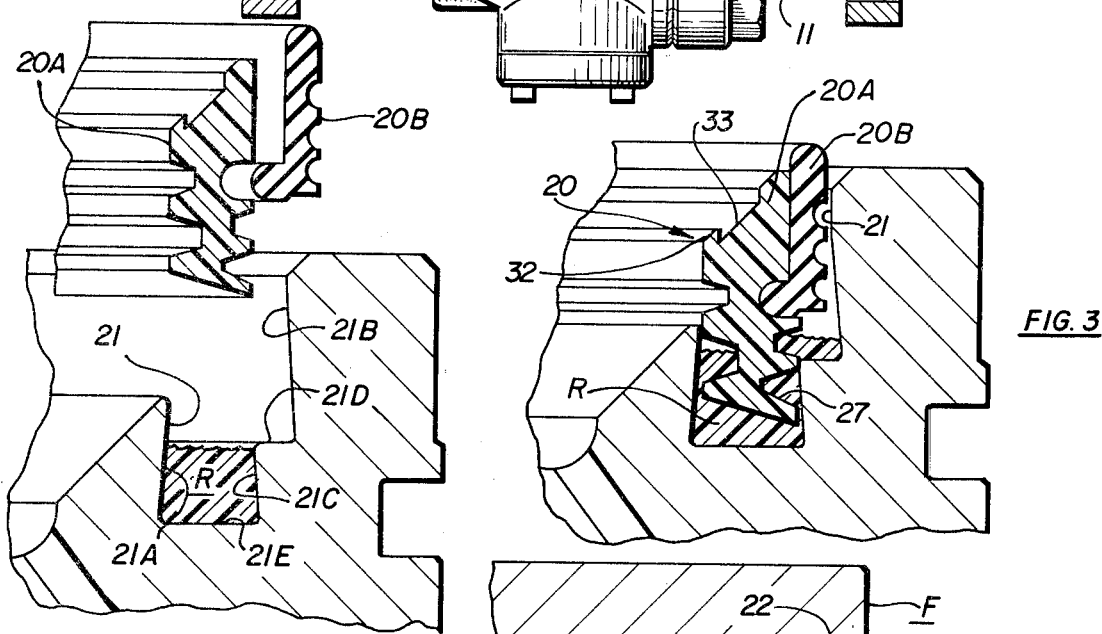
FIG. 2
FIG. 3
FIG. 4
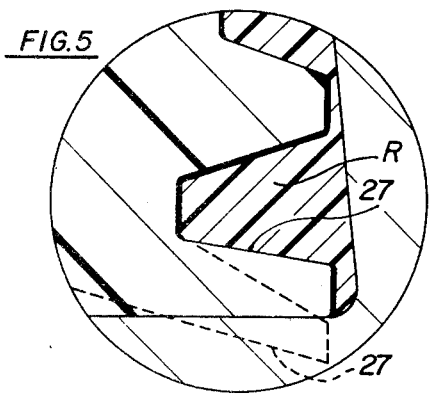
FIG. 5

SEAL ASSEMBLY FOR VALVES

This invention relates to a valve having a seal assembly which is received within an annular groove in the cavity of the body of the valve in which a closure member is mounted for movement between open and closed positions. The seal assembly seals between the valve body and the closure member in surrounding relation to the intersection of the flow way with the cavity. The invention also relates to an improved method for mounting the seal assembly within the groove during assembly of the valve. More particularly, this invention relates to improvements in such seal assemblies and methods of mounting same wherein the seal assembly is of the type which comprises inner and outer seal rings of relatively hard and soft sealing material which are especially well adapted to containing high and low pressures, respectively.

U.S. Pat. No. 4,034,959, issued July 12, 1977, and assigned to the assignee of the present application, discloses a ball valve in which a seal assembly is locked within its groove by means of a resin. The assembly is inserted into the groove, which is at least partially filled with the resin in a liquid or semi-solid state. The resin is then permitted to harden or set up while the seal ring is held within the groove. When the seal assembly requires replacement, it is cut out of the groove along with the resin, and the groove then prepared to receive additional resin for locking another assembly in place.

In order to properly seal against the closure member, the distance which the lips of the seal rings protrude from the groove - or "stand off" - must be kept within close tolerances. This is especially true in a ball valve where the groove is formed in a conically or spherically shaped surface, (usually the face of a seat ring received in a recess in the valve body) because, in this latter case, the radial dimensions of the groove also affect its axial dimensions, or depth, and thus directly affect the amount of stand off of the seal rings.

In order to control such stand off in the case of the valve of U.S. Pat. No. 4,034,959, the seal ring is held tightly against the closed end of the groove, as the resin hardens, by means of a fixture which is supported on the face of the seat ring. For this purpose, the seal ring is initially of greater length than required and has portions at its outer end which are free to flex as the fixture is moved into position, thereby assuring that the stand off will not be less than required.

However, the seal ring of the seal assembly of U.S. Pat. No. 4,034,959, is of one piece construction, and thus necessarily of relatively soft or relatively hard material best suited to contain high or low pressures, but not both. Furthermore, the seal assembly has no means for removing extraneous material from the surface of the closure member, and thus preparing it for sealing with the lip of the seal ring.

U.S. Pat. No. 4,163,544 issued Aug. 7, 1979 and assigned to the assignee of the present application, does show a valve having a seal assembly of the general type contemplated by this invention - namely, in which inner and outer seal rings are mounted within a groove in a seat ring which is carried in the valve body at the intersection of the flowway therethrough with the cavity therein. The seal rings are held within the groove by means of a flange portion on the inner diameter portion of the seat ring which is bendable inwardly between a position opening the outer end of the groove to permit the seal rings to be easily inserted therein or removed therefrom, and a position narrowing the outer end of the groove to tightly engage the seal rings in order to prevent their removal from the groove, and also expand them radially inwardly and outwardly to fill the groove.

In the valve of the aforementioned prior application, no attempt is made to control this stand off of the lips of the seal rings by the use of seal rings having predetermined dimensions. Instead, the seal rings are of excess length, when inserted into the groove, so that their outer ends must be machined off in order to form the sealing lips, after the rings are clamped in place by the bendable flange portion of the seat ring. Over and above the foregoing, the necessity for bending the flange portion of the seat ring back and forth to permit replacement of the seal rings weakens it to such an extent, at the point at which it bends, as to cause it to break off or become overstressed and lose its ability to remain tightly engaged with the seal rings.

An object of the present invention is to provide a seal assembly comprising inner and outer seal rings of relatively hard and soft sealing material which may be mounted in its groove within a ball valve without the problems described in mounting such an assembly in accordance with the above-noted pending application.

A more particular object is to provide such a seal assembly which may be so mounted without the need for bendable flange portions and machining off their outer ends to provide lips with the required stand off.

These and other objects are accomplished, in accordance with the illustrated embodiment of the present invention, by a seal assembly made up of such inner and outer seal rings of relatively hard and soft material which is locked within its groove by means of a resin which is contained within the groove in a liquid or semi-solid state, as the seal assembly is inserted therein prior to hardening and then permitted to harden as the assembly is held in place by a fixture with the lips on the front or inner ends of its seal rings in predetermined protruding or stand off positions with respect to the open end of the groove. For this purpose, the portion of the valve body in which the groove is formed, preferably a separate seat ring, is arranged in a generally horizontal position as the groove is at least partially filled with the hardenable resin.

The rings are interlocked against relative axial movement, as they are so inserted, so as to have a cross-sectional shape approximately that of the groove. More particularly, the seal rings are of such axial length that, when the assembly is inserted into the groove, the rear or outer end of one ring will engage the closed end of the groove prior to engagement therewith of the rear or outer end of the other ring. As the fixture is then placed over the seat ring and moved into supported position on the face of the seat ring, it pushes against a bearing surface on the front or inner end of the seal assembly to press the rear or outer end of the one seal ring tightly against the closed end of the groove, but without forcing the rear or outer end of the other ring against the closed end of the groove. This locates the lips of the seal rings with proper stand off beyond the open end of the groove, so that the fixture may be held in this position until the resin has hardened to the extent necessary to lock the assembly within the groove, after which the fixture may be removed.

In the preferred and illustrated embodiment of the invention, the sides of the groove and the adjacent sides of the rings diverge in a direction toward the closed end of the groove to define interlocking portions of hardened resin in the voids therebetween. The rings are further locked within the groove by means of resin which fills circumferential grooves formed on the inner side of the inner ring and the outer side of the outer ring. In accordance with the illustrated embodiment of the invention, the portion of the one ring which is forced into tight engagement with the closed end of the groove is a laterally extending flange which is bendable in a direction toward the open end of the groove.

Also, a first of the seal rings has a lip thereon, in addition to its sealing lip, which serves as a wiper ring to clean th spherical surface of the closure member as it rotates between opened and closed positions, whereby a tight seal is formed between it and the sealing lips of the seal rings. Preferably, the flange and the pair of lips, one of which serves as a wiper ring, are formed on the one ring made of relatively hard sealing material, which is normally the inner of the two rings. As illustrated, the bearing surface against which the fixture bears to force the assembly further into the groove is formed on this one ring circumferentially intermediate the pair of lips thereon.

In the drawings, wherein like reference characters are used throughout to designate like parts:

FIG. 1 is a vertical cross-sectional view of a ball valve having seal assemblies mounted within seat rings to provide seats for sealing between the valve body and both sides of the ball-shaped closure member thereof;

FIG. 2 is an enlarged sectional view of a portion of one of the seat rings and the inner and outer seal rings of the seal assembly to be inserted into a groove in the face of the seat ring;

FIG. 3 is a cross-sectional view of a seat ring similar to that of FIG. 2, but upon interfitting of the seal rings to form a seal assembly and partial insertion of the seal assembly into the groove in the seat ring;

FIG. 4 is another sectional view of the seat ring, similar to that of FIGS. 2 and 3, but upon forcing of the flange on the rear or outer end of one of the seal rings into tight engagement with the closed end of the groove in the seat ring by means of a fixture supported on the front or inner end of the assembly; and FIG. 5 is an enlarged detailed sectional view of the flange on the rear or outer end of the one seal ring, including dotted lines showing its position prior to being bent into its solid line position upon being forced into tight engagement with the closed end of the groove.

With reference now to the details of the above-described drawings, the overall valve, which is designated in its entirety by reference character 10, is shown in FIG. 1 to comprise a valve body 11 having a flowway 12 therethrough and a cavity 13 therein intermediate opposite ends of the flowway. A ball-shaped valve member 14 having a port 15 therethrough is mounted within the body cavity 13 for rotation between positions in which the port is aligned with the flowway, as shown in FIG. 1, so as to open the valve, and a position disposed 90° thereto so as to close the valve. A stem 16 connected to the closure member extends through the upper end of the valve body to provide an exterior part which may be manipulated to open and close the valve. A replaceable seat 17 is mounted within a recess 18 in the valve body at the intersection of each end of the flowway with the cavity 13. As will be described more fully hereinafter, each seat 17 is thus arranged to seal between the valve body and the closure member, on opposite sides of the latter, in both the opened and closed positions of the valve.

Each seat includes a seat ring 19 having an inner diameter aligned with flowway 12, and thus port 15 when the valve is open, and enlarged and reduced diameter portions which fit closely within similarly shaped portions of the recess 18, whereby the seat ring is free to slide axially toward and away from the closure member 14. The enlarged diameter of each seat ring carries a seal ring 19A for forming a sliding seal with a corresponding portion of the recess, and a seal assembly 20 is mounted within an annular groove 21 formed in the inner face of the seat ring concentrically of the opening therethrough for sealably engaging a substantially spherical or conically shaped surface on the ball-shaped closure member as it moves between opened and closed positions. The seal assembly is normally urged into sealing engagement with the closure member by means of leaf springs 23 received within the recess and acting between the valve body and seat ring to urge the seat ring inwardly toward the closure member.

As best shown in FIGS. 2 to 4, the groove 21 in each seat body is formed generally coaxially thereof and thus generally perpendicularly to the axis of rotation of the ball-shaped member. In the particular embodiment of the invention illustrated in the drawings, the groove is of stepped cross-sectional shape having an inner wall 21A, outer wall portions 21B and 21C, and end wall portions 21D and 21E closing the outer end of the groove. Each of inner wall 21A and outer wall portions 21B and 21C converge in a direction toward the open end of the groove. As previously described, inner ring 20A is formed of a relatively hard but resilient material, such as nylon, Teflon or the like, and outer ring 20B is formed of a relatively soft resilient material, such as natural or synthetic rubber.

As best shown in FIG. 3, the seal assembly is of a thickness not substantially less than that of the open end of groove 21 so as to permit it to be easily inserted therein. Furthermore, and as previously described, the inner ring 20A is of such length as to engage end surface 21E of the groove prior to engagement of the rear or outer end of outer seal ring 20B with end surface 21D of the groove. With the assembly so inserted, a sealing lip 23 on the front or inner end of ring 20A adjacent ball member 14 and a sealing lip 26 on the front or inner end of outer ring 20B adjacent ball member 14 will protrude or "stand off" from the inner face 22. As shown, the rings are received within one another and an annular flange 24 on the inner diameter of outer ring 20B fits closely within an annular groove 25 in the outer diameter of inner ring 20A so as to prevent axial movement between them as the assembly is so inserted.

The portion of the rear or outer end of inner ring 20A which first engages groove surface 21E is a flange 27 which extends toward the outer end of the ring. A fixture F, which may be a plate or a ring having a generally conical or spherically shaped face 28 conforming to the face 22 of the seat ring is moved into a position above the seat ring and the front or inner end of the seal assembly. The face 28 of the fixture has recesses 29 and 30 formed thereon on opposite sides of a bearing surface 31, which is adapted to engage a recessed bearing surface 33 on the inner end of inner seal ring 20A intermediate sealing lip 23 thereon and a wiper lip 32 formed on the inner end of the ring radially inwardly of the sealing lip. More particularly, the recesses 29 and 30 are of sufficient depth as to accommodate the sealing lips 23 and 26 and wiper ring 32 when the fixture is supported on the seal assembly, as described.

With the fixture so positioned, the face 28 thereof will be spaced somewhat from the face 22 of the seat ring due to the fact that, at this stage, lip 27 of the inner seal ring 20A has not been deformed into the position of FIGS. 4 and 5. With the fixture so disposed, it is urged downwardly toward the inner end of the seat ring so as to bring its face 28 into engagement with the seat ring face 22. This forces bearing surface 31 against bearing surface 33 of the inner seal ring, and thus the outer seal ring interfitted with the inner seal ring, further inwardly of the groove.

As the seal assembly is further inserted into the groove, flange 27 is bent, as previously described, to an extent dependent on the difference between the length of the inner seal ring and the distance between face 22 of the seat ring and end surface 21E of the groove therein. Thus, the flange will permit a fairly large tolerance between the two which might result from machining of the groove and molding of the seal ring. In any event, when the fixture has been fully seated so as to move the seal assembly into fully inserted position within the groove, each of the lips 23, 26 and 32 is held in a predetermined stand off position with respect to the face of the seat ring.

As previously described, prior to insertion of the seal assembly into the groove, groove 21 is at least partially filled with a hardenable resin R for locking the seal assembly within the groove. At this stage, the resin is in a liquid or semi-solid state, permitting the seal assembly to be moved downwardly through it, and permitting the resin to fill the voids between the seal assembly and the groove. For this purpose, and as illustrated, the seal ring is disposed in a generally horizontal position so as to contain the resin therein, as shown in FIG. 2.

During insertion of the seal assembly, the resin is of course displaced upwardly to fill the voids between the seal assembly and groove. With the seal assembly held by fixture F in inserted position, the resin is cured so as to cause it to harden and thus anchor the seal assembly within the groove. The resin may be of any suitable type best adapted for adhering to both the material of the seal rings as well as the walls of the groove within the metal seat ring, as fully described in the aforementioned U.S. Pat. No. 4,034,959.

As will be appreciated, the fixture F may be held in the position shown in FIG. 4 as the resin hardens, the surfaces of the fixture F, as well as the end face of the seat ring, being coated with a suitable agent for preventing the resin from adhering thereto. Due to the outward convergence of the side walls of the groove, the resin forms wedge-shaped interlocks between the inner and outer walls of the seal rings and the inner and outer walls of the groove. To further anchor the seal ring within the groove, the inner and outer diameters of the inner seal ring 20A as well as the outer diameter of the seal ring 20B may be provided with grooves into which the hardenable resin will flow as the seal assembly is inserted into the groove.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

While a ball valve has been illustrated in the drawings, it is understood that this invention may be utilized with gate valves. Thus, all matter herein set forth or shown in the accompanying drawings is to be interpreted as illustrative and not in a limiting sense.

What is claimed is:

1. In a valve having a body with a flowway therethrough, a cavity therein intermediate the ends of the flowway, a closure member mounted within the cavity for movement between opened and closed positions, and an annular groove in the cavity surrounding the flowway on one side of the closure member; apparatus comprising an improved seal assembly having inner and outer rings of relatively hard and soft sealing material which are locked within the groove by means of a resin which has hardened within voids between the assembly and groove, each ring having a lip on its front end which protrudes from the groove for sealably engaging the spherical surface of the closure member, interlocking means on the rings which prevents relative axial movement between them, said assembly having a bearing surface on its front end which supports a fixture disposable over the surface of the cavity in which the groove is formed, when the assembly is inserted into the groove, in order to hold the rear end of one ring tightly engaged with the closed end of the groove as the resin hardens, and the rear end of the other ring being spaced from the closed end of the groove, when the rear end of the one ring is held in tight engagement therewith, whereby the extent of protrusion of their lips is determined by the location of said one ring in a direction axially of the groove.

2. Apparatus of the character defined in claim 1, wherein the adjacent sides of the groove and the seal rings diverge in a direction toward the closed end of the groove to define interlocking portions of hardened resin therebetween.

3. Apparatus of the character defined in claim 1, wherein the inner side of the inner ring and outer side of the outer ring have circumferential grooves thereabout filled with resin.

4. Apparatus of the character defined in claim 2, wherein the inner side of the inner ring and outer side of the outer ring have circumferential grooves thereabout filled with resin.

5. Apparatus of the character defined in claim 1, wherein the rear end of said one ring has a flange which extends in a direction away from the front end of said ring and at an acute angle to a plane perpendicular to the axis thereof, so as to be bendable in a direction toward the front end thereof in order to tightly engage the closed end of the groove.

6. A seat for a ball valve, comprising an annular body having inner and outer sides, a generally conically shaped face on one end, and an annular groove in said face, a seal assembly having inner and outer rings of relatively hard and soft sealing material which are locked within the groove by means of a resin which has hardened within voids between the assembly and the groove, each ring having a lip on its front end which protrudes from the groove for sealably engaging the spherical surface of the closure member, interlocking means on the rings which prevents relative axial movement between them, said assembly having a bearing surface on its front end which supports a fixture disposable over the face of the seat body, when the assembly is inserted into the groove, in order to hold the rear end of one ring tightly engaged with the closed end of the groove as the resin hardens, and the rear end of the other ring being spaced from the closed end of the groove, when the rear end of the one ring is held in tight engagement therewith, whereby the extent of protrusion of their lips is determined by the location of said one ring in a direction axially with the groove.

7. A seat of the character defined in claim 6, wherein the adjacent sides of the groove and the seal rings diverging in a direction toward the closed end of the groove to define interlocking portions of hardened resin therebetween.

8. A seat of the character defined in claim 6, wherein the inner side of the inner ring and outer side of the outer ring have circumferential grooves thereabout filled with resin.

9. A seat of the character defined in claim 7, wherein the inner side of the inner ring and outer side of the outer ring have circumferential grooves thereabout filled with resin.

10. A seat of the character defined in claim 6, wherein the rear end of said one ring has a flange which extends in a direction away from the front end thereof and at an acute angle to a plane perpendicular to the axis thereof, so as to be bendable in a direction toward the rear end thereof in order to tightly engage the closed end of the groove.

* * * * *